US011188420B2

(12) United States Patent
Silverstein et al.

(10) Patent No.: US 11,188,420 B2
(45) Date of Patent: Nov. 30, 2021

(54) DEFECT RESOLUTION IN A SOFTWARE SOLUTION

(71) Applicant: International Business Machines Corporation, Armonk, NY (US)

(72) Inventors: Zachary A. Silverstein, Jacksonville, FL (US); Samir Nasser, Durham, NC (US); Neil Delima, Scarborough (CA); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/744,102

(22) Filed: Jan. 15, 2020

(65) Prior Publication Data

US 2021/0216406 A1 Jul. 15, 2021

(51) Int. Cl.
*G06F 11/00* (2006.01)
*G06F 11/14* (2006.01)
*G06F 11/36* (2006.01)
*G06N 20/00* (2019.01)
*G06F 11/07* (2006.01)
*G06F 11/30* (2006.01)

(52) U.S. Cl.
CPC ...... *G06F 11/1438* (2013.01); *G06F 11/0766* (2013.01); *G06F 11/3055* (2013.01); *G06F 11/3688* (2013.01); *G06N 20/00* (2019.01)

(58) Field of Classification Search
CPC ............. G06F 11/1438; G06F 11/0766; G06F 11/3055; G06F 11/3688; G06F 11/3604; G06F 11/3612; G06F 11/3616; G06F 11/362; G06F 11/3624; G06F 11/3664; G06F 11/368; G06N 20/00
See application file for complete search history.

(56) References Cited

U.S. PATENT DOCUMENTS

| | | | |
|---|---|---|---|
| 6,074,434 A | 6/2000 | Cole et al. | |
| 8,935,673 B1 * | 1/2015 | Ashkenazi | G06F 11/3636 717/125 |
| 9,400,644 B2 | 7/2016 | Mahajan | |
| 10,379,838 B1 | 8/2019 | Chud | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Joseph D Manoskey
(74) *Attorney, Agent, or Firm* — Law Office of Jim Boice

(57) ABSTRACT

A method addresses a defect in software. The method periodically captures snapshots of versions of code for a particular software program as one or more functionalities are added to the particular software program. The method determines that a current version of the particular software program has a defect, and then iteratively tests previous versions of that particular software program until a most-recent non-defective version of the particular software program is detected. A software developer is directed to either debug the current version of the particular software program, or else re-create the current version of the particular software program from the most-recent non-defective version of the particular software program, depending on which approach is faster.

17 Claims, 6 Drawing Sheets

(56) References Cited

U.S. PATENT DOCUMENTS

| | | | |
|---|---|---|---|
| 2015/0082277 A1* | 3/2015 | Champlin-Scharff | G06F 8/70 |
| | | | 717/120 |
| 2016/0034270 A1 | 2/2016 | Swiere et al. | |
| 2016/0124835 A1* | 5/2016 | Davis | G06F 11/3636 |
| | | | 714/38.1 |
| 2017/0235569 A1 | 8/2017 | Sturtevant et al. | |
| 2019/0108001 A1 | 4/2019 | Hauser | |
| 2019/0227912 A1 | 7/2019 | Banuelos et al. | |
| 2020/0065220 A1* | 2/2020 | Sobran | G06F 11/362 |
| 2021/0117308 A1* | 4/2021 | Burgos | G06F 11/3636 |

OTHER PUBLICATIONS

Zhang et al., "Predicting Bug-Fixing Time: An Empirical Study of Commercial Software Projects", Tsinghua University, Beijing, China, 2013.

Software Test Estimation Techniques (Test Effort Estimation Complete Guide), Software Testing Help, Jul. 2, 2019.

Giger et al., "Predicting the Fix Time of Bugs", University of Zurich, May 4, 2010.

\* cited by examiner

DEFECT RESOLUTION IN A SOFTWARE SOLUTION

BACKGROUND

The present invention relates to the field of correcting software defects. Still more specifically, the present invention relates to the field of correcting a software defect using different approaches, depending on an amount of time required and/or time available to correct the software defect.

SUMMARY

In an embodiment of the present invention, a method directs a software developer on how to optimally address a defect in software. The method periodically captures snapshots of versions of code for a particular software program as one or more functionalities are added to the particular software program. The method determines, based on performing a test on a current version of the particular software program, that the current version of the particular software program has a defect. The method iteratively tests, going backwards in time, captured snapshots of one or more previous versions of the particular software program until a most-recent non-defective version of the particular software program is detected that lacks an intended functionality of the current version of the particular software program. The method compares an estimated debug time to debug the current version of the particular software program to an estimated recreation time to create a first non-defective version of the particular software program from the most-recent non-defective version. Based on which of the estimated debug time and the estimated recreation time is shorter as compared to one another, the method selectively directs a software developer to correct the defect and provide the intended functionality by either debugging the current version of the particular software program or creating the first non-defective current version of the particular software program from the most-recent non-defective version of the particular software program.

In an embodiment of the present invention, the method further includes the feature of applying machine learning to determine the estimated recreation time for the software developer to create the first non-defective current version of the particular software program from the most-recent non-defective version of the particular software program.

In an embodiment of the present invention, the method further includes the feature of applying machine learning to determine the estimated debug time for the software developer to debug the current version of the particular software program in order to create a second non-defective current version of the particular software program, where the second non-defective current version of the particular software program has the intended functionality but not the defect found in the current version of the particular software program.

In one or more embodiments, the method(s) described herein are performed by an execution of a computer program product in a computer system.

DETAILED DESCRIPTION

Figure 1:
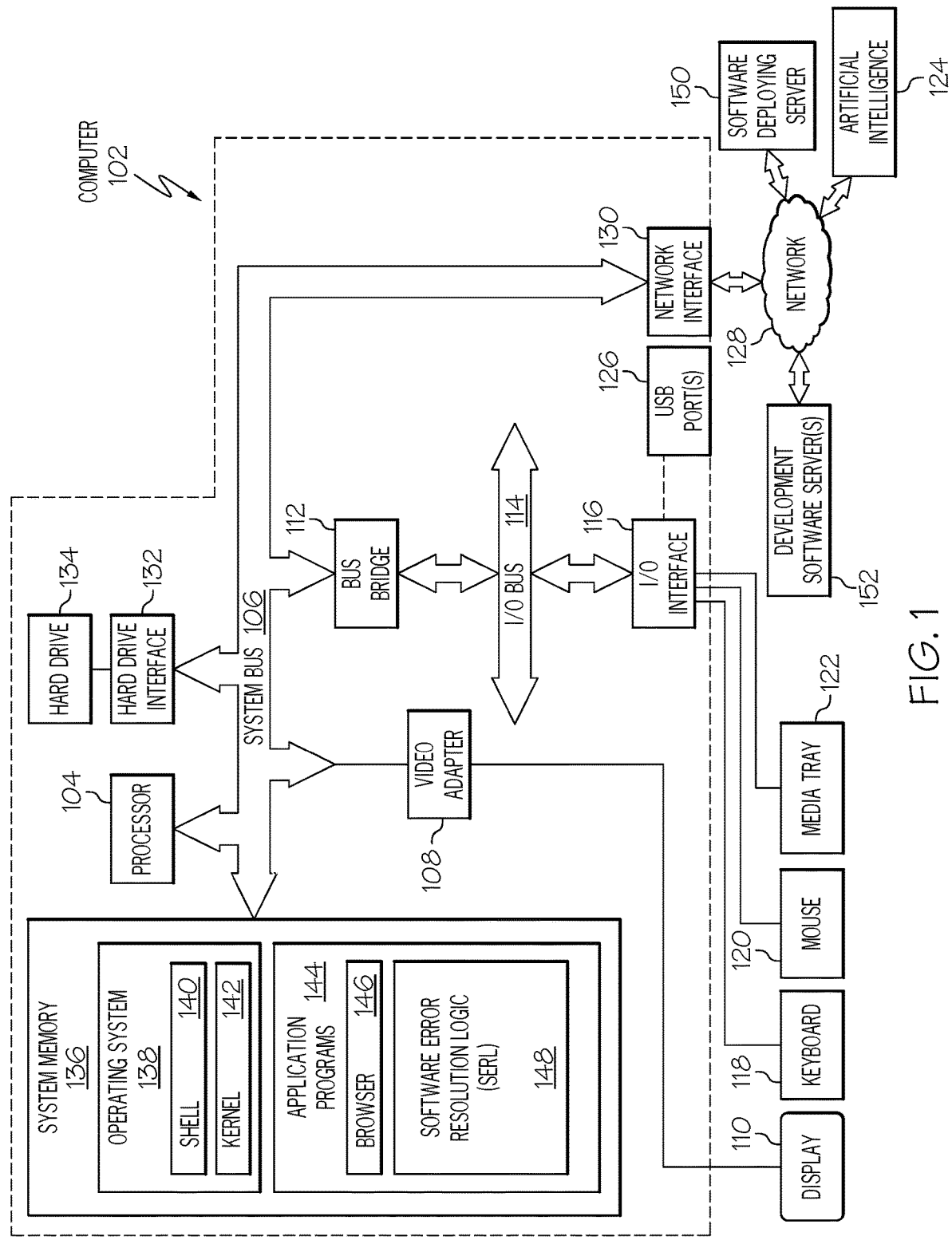
FIG. 1 depicts an exemplary system and network in which the present disclosure is implemented in one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of one or more embodiments of the present invention. Note that some or all of the exemplary architecture, including both depicted hardware and software, shown for and within computer 102 may be utilized by artificial intelligence 124 and/or software deploying server 150 and/or development software server(s) 152 shown in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a network 128 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, one or more embodiments of the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory also include a Software Error Resolution Logic (SERL) 148. SERL 148 includes code for implementing the processes described below, including those described in FIGS. 2-4. In one or more embodiments of the present invention, computer 102 is able to download SERL 148 from software deploying server 150, including in an on-demand basis, wherein the code in SERL 148 is not downloaded until needed for execution. Note further that, in one or more embodiments of the present invention, software deploying server 150 performs all of the functions associated with the present invention (including execution of SERL 148), thus freeing computer 102 from having to use its own internal computing resources to execute SERL 148.

Also accessible to computer 102 are development software server(s) 152, which provide current and previous versions of a particular software program to computer 102 for evaluation, as described below. In an embodiment of the present invention, computer 102 and development software server(s) 152 are a same computer. In another embodiment of the present invention, computer 102 and development software server(s) 152 are different computers.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

One or more embodiments of the present invention address the problem/question of how to determine whether it is more efficient and cost effective to resolve a problem defect in live software system by providing a code fix (debug) as opposed to starting with a good code snapshot and re-implementing the functionality (recreation).

When defects occur in live software systems, depending on the type and complexity of the defect, support and development teams can spend an excessive amount of time investigating, re-producing, fixing and testing a fix for the problem. This time vested is most often unknown upfront and can exceed the time and effort to re-implement the functionality on the last known good code snapshot.

In one or more embodiments of the present invention, the effort to re-implement the functionality of the error-containing code is based on a coding history of one or more software developers (who, in an embodiment of the present invention, will be tasked with correcting the error-containing code) and is used to decide whether to provide a code fix or re-implement the functionality on the last defect free code snapshot.

Thus, one or more embodiments of the present invention utilize a system that has a record of code snapshots, a log of code changes that went into each snapshot, and the effort that went into implementing the code changes to implement the change (e.g., how long it took a particular software developer to generate the code change).

In an embodiment of the present invention, a "code snapshot" is simply a record of source code in a software program that is being deployed and/or amended in a manner described herein.

In another embodiment of the present invention, a "code snapshot" includes state information for an environment of the software code during the code snapshot (e.g., cache contents and states, which processors were being used, etc. when the code snapshot was taken).

Starting with the most current snapshot of a particular software program, the system captures each changeset, builds and deploys the solution to a test environment, and executes a test case captured to reproduce the original error. That is, the most current snapshot is executed in the test environment (e.g., an integrated development environment—IDE), where it shows (e.g., in a pane in a software testing user interface) that an error occurred when executing the particular software program.

In one or more embodiments of the present invention, the software testing user interface not only depicts the current version of the code being tested and the error that occurred, but also the environment in which the software testing occurs. That is, in one or more embodiments of the present invention, the test environment is able to emulate various hardware and software systems (e.g., operating systems), thus giving the software developer additional information about the environment of the software failure/error.

If the error is reproducible (i.e., occurs when a particular version of the particular software program executes), the changeset (changes to the code in the particular software program) is marked as clean and the system moves on to build and deploy with the solution masking the next snapshot. If the error is reproducible after all changesets in the snapshot have been tested, this implies that the error potentially exists in a changeset in a previous snapshot and the system continues building, testing and deploying each changeset in the previous code snapshot. That is, if the error occurs in a particular version of the particular software program, then this confirms that this particular version of the particular software program contains the bug/error.

If the error is not reproducible for a masked changeset or a different error is generated, this changeset potentially is the cause of the error. That is, if the error does not occur in a certain version of the particular software program, then the code that changed (as identified by the masking of the later version) is deemed to be the cause of an error.

The system looks up the effort associated with that changeset and uses it as an estimate of the re-implementation effort to resolve the error. For example, if the changeset (code that caused the error that was identified by the masking process) took 15 minutes to code, then an estimate is that it will take 15 minutes to write new code that provides the same functionality as the code that previously caused the error.

In one or more embodiments of the present invention, other factors taken into consideration include the relation of code between changesets in the same snapshot and across snapshots.

That is, in one or more embodiments of the present invention, the relationship between changesets within a same snapshot are used to determine that the error is caused by 1) this relationship, and 2) one or more of the changesets within the same snapshot.

Furthermore, and in one or more embodiments of the present invention, the relationship between changesets within different snapshots are used to determine that the error is caused by 1) this relationship, and 2) one or more of the changesets within the different snapshots.

The solution provided herein provides several new, useful, and non-obvious improvements over the prior art.

First, the present invention is different from a prior art continuous integration/continuous delivery (CI/CD) pipeline, in which small changes to software are implemented and immediately checked for problems (e.g., errors, faults, failure to provide the desired functionality, etc.). Rather, in one or more embodiments of the present invention, each changeset in a snapshot is masked such that multiple generations of code changes/errors can be corrected at a latest version's deployment.

Second, the present invention not only provides a persistence mechanism to keep track of code changes in each good snapshot, but also the effort associated with each changeset.

Figure 2:
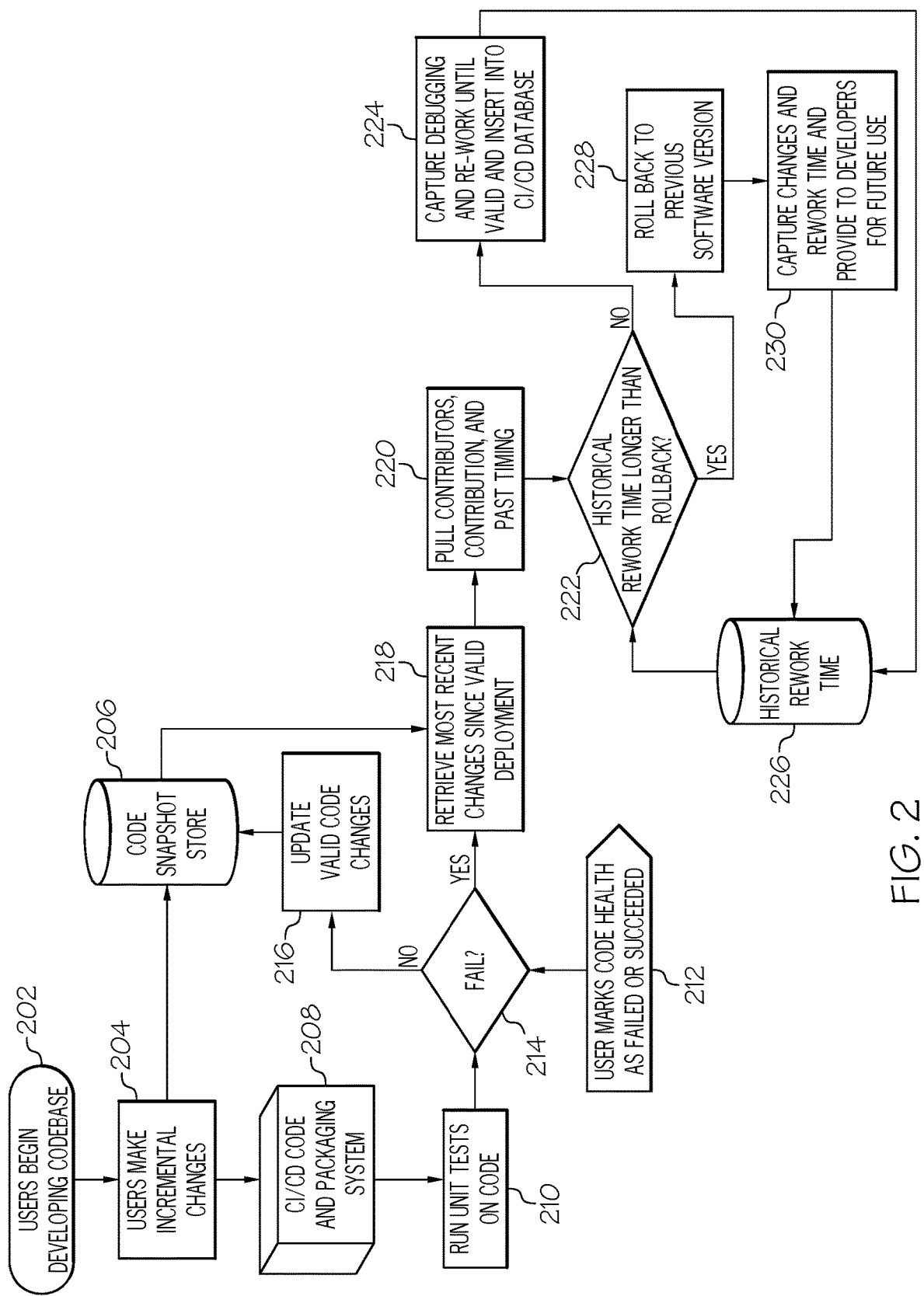
FIG. 2 illustrates a high-level overview of a method performed in one or more embodiments of the present invention.

With reference now to FIG. 2, a high-level overview of one or more embodiments of the present invention is presented.

As shown in block 202, one or more software developers begin developing a codebase for a particular software program.

As shown in block 204, software developers (software developers who began developing the codebase shown in block 202 and/or other software developers) make incremental changes to the particular software program. Various factors associated with each incremental change are captured in a snapshot, which is sent to a code snapshot store 206 for storage. Such factors include, but are not limited to, metadata, timing, and/or complexity of the incremental changes.

The metadata associated with the incremental changes describes, but is not limited to, an identification of which particular software developer(s) created the code associated with the incremental changes.

The timing associated with the incremental changes describes how long the particular software developer(s) took to write and deploy the code associated with the incremental changes.

The complexity of the incremental changes describes, but is not limited to, a description of what other functions (e.g., other software routines) are called by the code associated with the incremental changes, how many lines of code are in the code associated with the incremental changes, etc.

As shown in block 208, the particular software program, with the incremental changes, is also sent to a CI/CD code and packaging system 208, which sends the particular software program (with the incremental changes) to a testing unit (e.g., an IDE, a custom test system, etc.), which tests the incrementally changed software program, as shown in block 210.

As shown in block 212, a user then marks the incrementally changed software program as having failed (e.g., has an error, fault, etc.), or having succeeded (e.g., the intended change to the functionality of the particular software program, such as adding a table, has been implemented without any errors/faults occurring). In other examples (not depicted), an aspect of a system (e.g., such as the computer 102 of FIG. 1) can itself detect an error via, e.g., a process of the incrementally changed software program returning an error code, or a process of the incrementally changed software program encountering an infinite loop, or the like.

If the test on the incrementally changed software program does not fail (query block 214), then the changes are deemed valid for updating the particular software program (block 216), and the changes are stored in the code snapshot store 206.

However, if the incrementally changed software program fails (query block 214), then the system retrieves any changes that have been applied to the particular software program since it did not fail, as shown in block 218. That is, during an earlier snapshot, the particular software program worked without any errors/faults. However, during the current snapshot, the changed version of the particular software program failed. The changes found in the changed version of the particular software program are thus retrieved in block 218.

In block 220, the contributor (software developer who wrote the changes), contribution (what code the contributor added to the particular software program), and the past timing are pulled from snapshots stored in the code snapshot store 206.

That is, in block 220, the system first determines who (contributor) wrote the changes to the code (which ended up causing a failure), along with the changes to the code (contribution) themselves.

Furthermore, in block 220, a historical record of how long (past timing) it has taken the contributor and/or another software developer to either debug code in software programs (e.g., the particular software program and/or other software programs) or to roll back to an earlier error-free version of software programs (e.g., the particular software program and/or other software programs) and re-code a current version to provide an intended functionality (e.g., containing a new table) is retrieved.

As shown in query block 222, if historically it has taken the contributor and/or another software programmer longer to roll back to an earlier error-free version of a software program (e.g., the particular software program and/or other software programs), then the software programmer(s) are directed to debug the code in the current particular software program until the error(s) are resolved, as shown in block 224, and these debugging efforts are saved in a database of historical rework time 226 for these software programmer(s), which in a preferred embodiment is the software programmer that wrote and deployed the code that caused the error in current version of the particular software program.

However, if historically it took longer for the software programmer(s), such as the software programmer who wrote the code that caused the error in the current version of the particular software program, to debug the current version of the particular software program than to roll back to the earlier error-free version and to re-write code needed to provide the intended functionality in the current version of the particular software program, then the system retrieves the earlier error-free version of the particular software program (block 228), and the new code written by the software programmer(s) to replicate the desired functionality is captured for use by other developers in the future (block 230) and stored in the database of historical rework time 226. That is, once the software programmer(s) writes new code that provides the functionality that the previous error-containing code tried but failed to provide, this new error-free (i.e., causing substantially no errors, which is to say no errors that are currently detected that preclude successful utilization of the particular software program) code, the coder's name, the amount of time used to rewrite the code, etc. is stored in the database of historical rework time 226. That is, the term "error-free" is defined as describing software that is able to perform one or more predefined functions that the software is designed to deliver, even though other errors, which do not affect the one or more predefined functions that the software is designed to deliver, could still be present. For example, if a predefined function that the software is designed to deliver is the presentation of a table on a GUI, and the software causes the presentation of that table on the GUI in a manner that provides the functionality for which the table was designed/intended (e.g., to enter and/or retrieve data from the table), then the software is deemed to be error-free, even if other errors in the software exist (e.g., code that causes an insignificant typographical error in a label in the table; code that causes an error to another function, such as displaying a link to another resource that is unrelated to the table; etc.).

Thus, this detailed and specific implementation of the described process allows the system to either advise the software developer which approach to take (debugging the current version or re-coding an earlier version), or else to automatically take one of these approaches (assuming that the system is able to auto-correct bugs and/or generate known error-free code).

As such, FIG. 2 provides an overview of marking and capturing, as a user develops a codebase, incremental changes to a software program.

In an embodiment of the present invention, the updates made to a particular module in the software program are stored in a list such as the buffer string p[ ].

In an embodiment of the present invention, each incremental change derives multiple values, including:

Formulation Time: $F\_t$ (i.e., how long it historically takes a particular software developer to mentally develop a solution to a particular type of execution error)

Actual Change Time: $C\_t$ (i.e., how long it historically takes the particular software developer to actually write code the solves the particular type of execution error)

Actual Change Complexity: $Ch\_t$ (i.e., the line count of code written by the particular software developer that historically has solved the particular type of execution error; other resources, such as other programs, hardware, etc. that historically have been affected by code written by the particular software developer to solve the particular type of execution error, etc.)

Change Contributor: $CC\_t$ (i.e., the software developer who wrote the code to solve the particular type of execution error)

Related Contribution: $RC\_t$ (i.e., other team members that assisted the software developer who wrote the code to solve the particular type of execution error)

Change Metadata: $CM^*$ (i.e., where the code that caused the error is located in the program, etc.)

In an embodiment of the present invention, the health of the current version of the particular software program (i.e., whether it contains and/or causes an error) is detected. This error detection is either automatic or manual.

If a current version of the software program (as shown in a current snapshot) is unhealthy, then the most recent healthy code snapshot is retrieved.

The method then creates a list of contributions with related attributes from earliest to latest, and presents this list to the software developer with guidance on changes necessary. That is, the software developer is not only alerted to the fault in the current version of the particular software program, but is also given an estimate of code re-implementation time requirement (debugging) versus a code base reversion to a previous snapshot time requirement (recreating).

Utilize a feedback loop of actual re-implementation time for future prediction of code rework, the data-frame running in the system ingests the above inputs as a matrix of values (i.e. the time metrics and the metadata pointer that points to the address of new memory location that has been added), in order to create an input list X defined as:

List $X=[F\_t, C\_t, Ch\_t, CC\_t, RC\_t, CM^*]$

In an embodiment of the present invention, a latent Dirichlet allocation (LDA) uses natural language processing (NLP) to run the buffer string p[ ] to create a Snapshot matrix by generating a bag of words output as part of the snapshot matrix, such as:

Snap [ ]=[0,0,1, . . . n]

The Snap[ ] outputs a 1 where code changes were done as part of the matrix.

The output takes into account the convolution of List X and Snap[ ], such that the output $O/P = X \hat{} Snap[\ ]$ The convolution (reiterated) output runs through the time sequence in order to provide Gaussian curves of the times from the earliest (e.g., time t) to t+delta_t, where delta_t equals the difference in time between the first change and the latest change to the software program.

In an embodiment of the present invention in which the historical records of debugging and/or re-coding program are crowdsourced (e.g., from multiple sources), the crowdsourced instances for time change delta are gathered in normalized feature vector function (e.g., a vector function $F\_t$), in which $F\_t$ is compared with the output (O/P) to see the most probable estimate for the actual re-implementation time for future prediction of code rework vs code reversion. If the generated difference is greater than $20\%^*T\_diff$, then the method reverts to the original state, or else re-implements the change with new code.

As described above, the system first determines which process will take longer: debugging the problem in the current version of the particular software program, or reverting back to the last error-free version of the particular software program and re-writing code to provide the functionality that the current version of the particular software program (e.g., adding a table) was supposed to provide.

In one or more embodiments of the present invention, the decision to debug, re-code, or to do neither depends on how much time is available to the software programmer. For example, assume that the particular software program must be put back online (e.g., in order to meet operational requirements) within 30 minutes from the time that the error was detected. If the problem can likely (based on the software programmer's track record) be either solved by debugging the code in the current version of the particular software program in 20 minutes, or by reverting back to an earlier error-free version and rewriting an error-free version of the error causing code in 10 minutes, then either approach can be taken. However, if only 15 minutes are available, then the system will direct the software programmer to rewrite the current version of the software program based on the earlier error-free version. Furthermore, if only 5 minutes are available to put the particular software program back on line, then the previous error-free version (without the new functionality that the current version was supposed to provide) is put on line.

Figure 3:
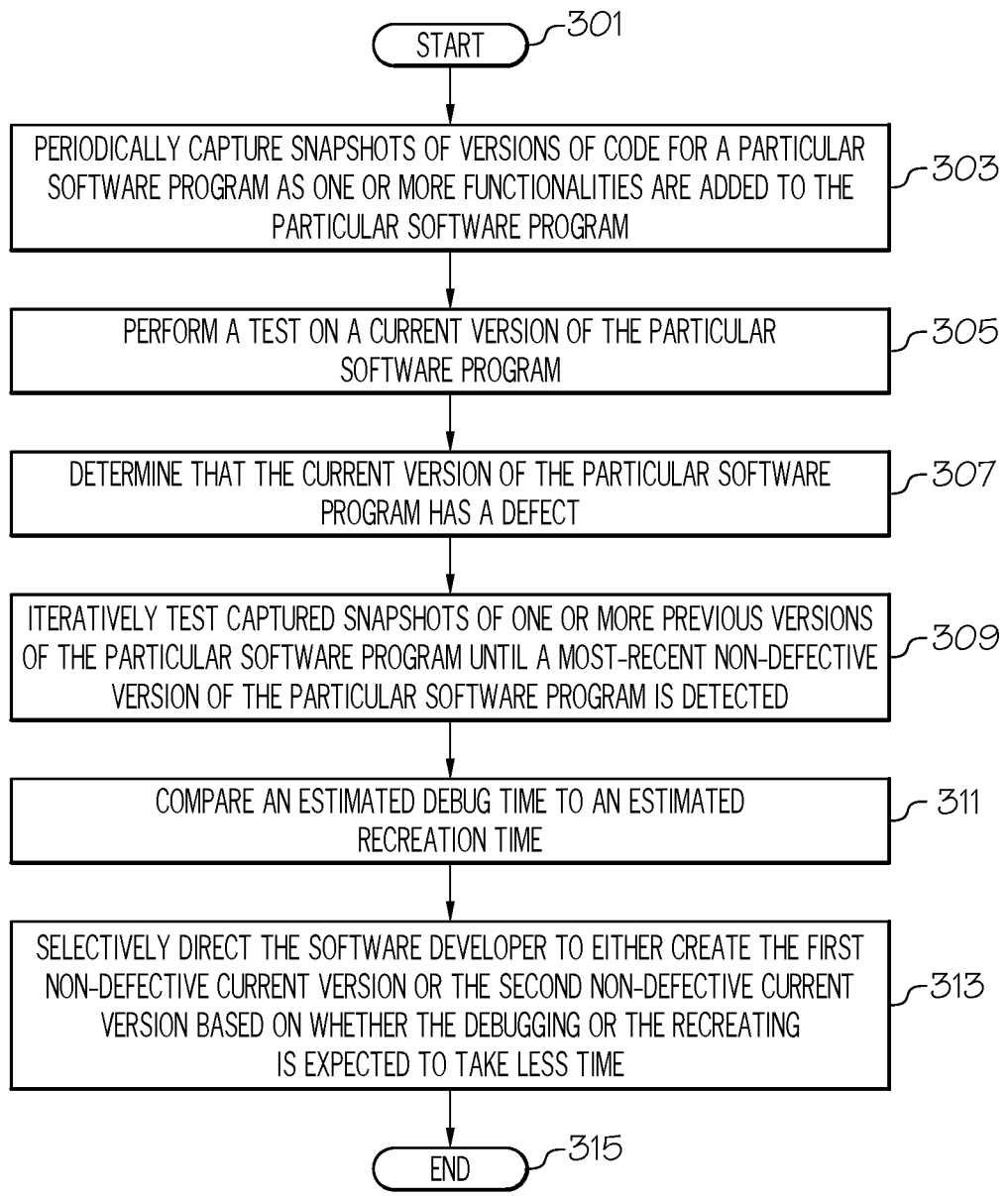
FIG. 3 illustrates a high-level flow-chart of a method performed in one or more embodiments of the present invention.

With reference now to FIG. 3, a high-level flow chart of steps performed by one or more embodiments of the present invention is presented.

After initiator block 301, the method (e.g., as performed by one or more processors, such as processor 104 shown in FIG. 1) periodically captures snapshots of versions of code for a particular software program as one or more functionalities are added to the particular software program, as described in block 303. In an embodiment of the present invention, this particular software program, and/or other software programs that are used to determine the historic capability of a software developer to debug and/or re-write code, is retrieved from the development software server(s) 152 shown in FIG. 1.

As described in block 305, the method performs a test on a current version of the particular software program.

As described in block 307, the method determines, based on performing the test on the current version of the particular software program, that the current version of the particular software program has one or more defects. In an embodiment, these one or more defects are identified by type and quantity. For example, the method could identify two page fault errors, and one overflow error.

As described in block 309, the method iteratively tests, going backwards in time, captured snapshots of one or more previous versions of the particular software program until a most-recent non-defective version of the particular software program is detected. As described herein, the most-recent non-defective version of the particular software program lacks an intended functionality (e.g., a table on a user interface) of the current version of the particular software program. Further, as used herein, "non-defective" as applied to a most-recent non-defective version of the particular software program relates to this identified version not including the error or defect identified in block 307 (e.g., even if this identified version of the particular software program includes other detected or undetected bugs). As such, and in an embodiment of the present invention, the "non-defective version of the particular software program" is "error-free" according to the definition of "error-free" provided above.

As described in block 311, the method compares an estimated debug time to an estimated recreation time. That is, assume that a determination of the estimated recreation time and the estimated debug time have been made. The estimated recreation time is the estimated amount of time that a software developer would need to create a first non-defective current version of the particular software program from the most-recent non-defective version of the particular software program, where the first non-defective current version of the particular software program has the intended functionality but not the defect found in the current version of the particular software program. The estimated debug time is the amount of time that the software developer would need to debug the current version of the particular software program in order to create a second non-defective current version of the particular software program, where the second non-defective current version of the particular software program also has the intended functionality but not the defect found in the current version of the particular software program. In an embodiment of the present invention, the estimated debug time and the estimated recreation time are determined using machine learning, such as the deep neural network (DNN) machine learning system described below in FIG. 4.

In an embodiment of the present invention, the first non-defective current version of the particular software program and the second non-defective current version of the particular software program contain different code and the same functionality. That is, the debugged code and the recreated code contain different instructions, but produce the same functionality (e.g., a table is inserted into a GUI).

In an embodiment of the present invention, the first non-defective current version of the particular software program and the second non-defective current version of the particular software program contain different code and different functionality. That is, the debugged code provides a first functionality (e.g., a 2×2 table is inserted into the GUI), while the recreated code provides a second functionality (e.g., a 4×4 table is inserted into the GUI).

As described in block 313, the method selectively directs the software developer (which in an alternative embodiment of the present invention is an automatic code generator), based on which of the estimated debug time and the estimated recreation time is shorter as compared to one another, to correct the defect in the current version of the particular software program by either debugging the current version of the particular software program (in order to create the second non-defective current version of the particular software program) or by creating the first non-defective current version of the particular software program from the most-recent non-defective version of the particular software program.

The flow-chart ends at terminator block 315.

In an embodiment of the present invention, the method further includes monitoring coding by the software developer over time on a variety of projects to determine, based on the machine learning, how long it takes the software developer to debug various types of errors in code. The method further includes monitoring coding by the software developer over time on the variety of projects to determine, based on the machine learning, how long it takes the software developer to create an error-free current version of a software program from an earlier version of the software program. The method then utilizes the monitoring of the coding by the software developer over time on the variety of projects (both for debugging as well as creating the error-free current version from an earlier version of the software program) to determine the estimated recreation time and the estimated debug time for the software developer for the current version of the particular software program.

That is, in this embodiment of the present invention, the amount of time predicted to either debug the current version of the particular software program or else re-create the current version of the particular software with the intended functionality but without the defect, is based on how long it has taken this particular software developer to debug/re-create other programs. In an embodiment of the present invention, these other programs are similar to (e.g., provide the same type of functionality, run on the same environment, etc.) the particular software program being currently corrected. In another embodiment of the present invention, these other programs are dissimilar to (e.g., provide the different type of functionality, run on a different environment, etc.) the particular software program being currently corrected.

In an embodiment of the present invention, the snapshots of the versions of the code for the particular software program depict only source code used in the versions of the code for the particular software program.

In an embodiment of the present invention, the snapshots of the versions of the code for the particular software program depict soft states at the time that the snapshots are taken, such as the current cache states at the time of the snapshots, which instruction is currently executing at a time of the snapshots, etc.

In an embodiment of the present invention, the snapshots of the versions of the code for the particular software program identify a hardware environment of a particular computer that is executing the particular software program at a time of the snapshots.

In an embodiment of the present invention, the machine learning utilizes a neural network.

Figure 4:
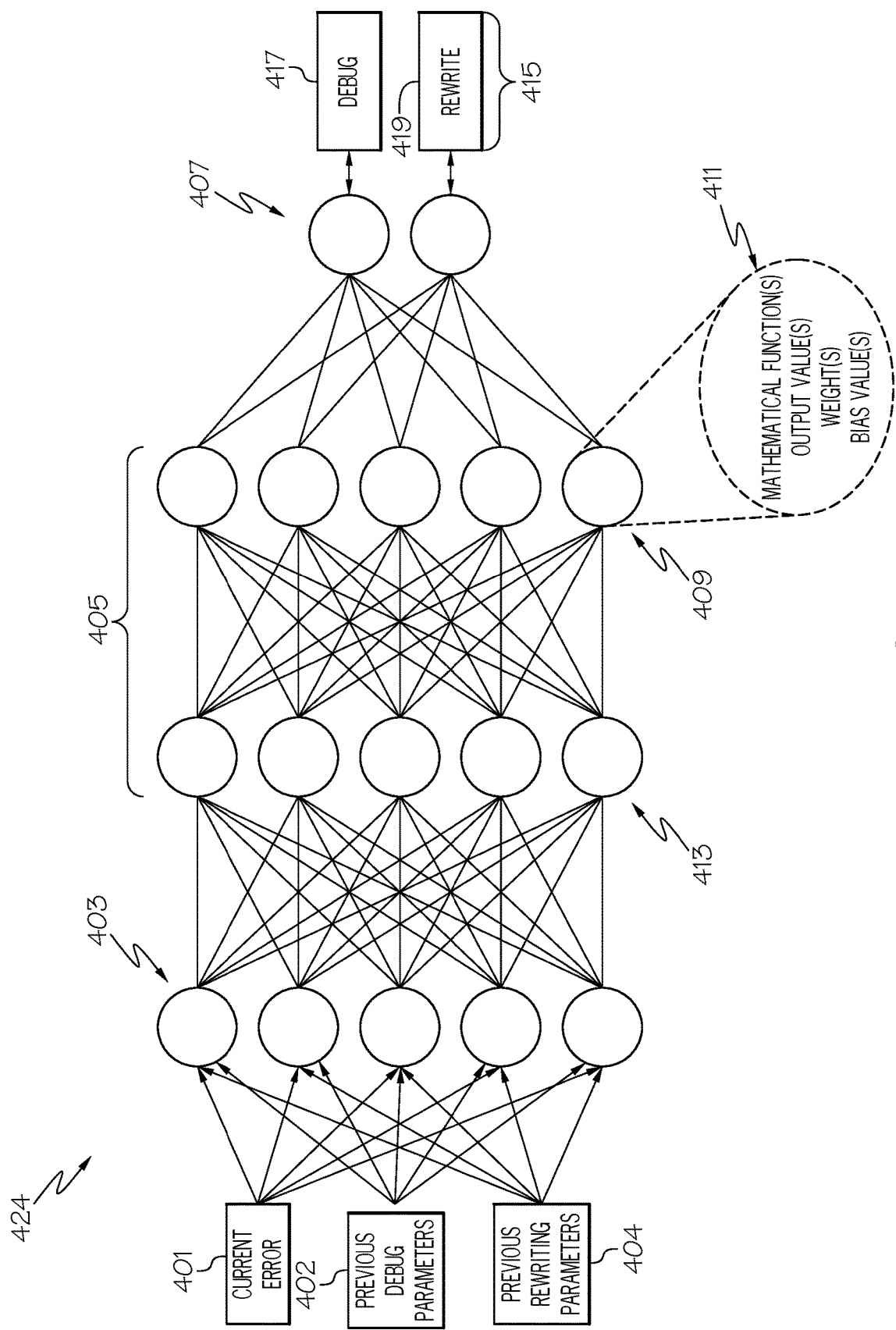
FIG. 4 illustrates an exemplary deep neural network (DNN) that is used in one or more embodiments of the present invention.

For example, and with reference now to FIG. 4, the artificial intelligence 124 shown in FIG. 1 is implemented as the deep neural network (DNN) 424 shown in FIG. 4.

The trained deep neural network (DNN) 424 shown in FIG. 4 (analogous to artificial intelligence 124 shown in FIG. 1), compares the current error 401 to previous debug parameters 402 and/or previous rewriting parameters 404 in order to determine whether the current error should be corrected by debugging the current version of the particular software program or by rewriting the most-recent non-defective version of the particular software program in order to arrive at an error-free current version of the particular software program.

In order to understand how DNN 424 is trained to make this decision, an overview of one or more embodiments of the architecture of DNN 424 as used in one or more embodiments of the present invention is now presented.

Logic units within DNN 424 are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network, as described herein, is made up of electronic neurons that mimic biological neurons through the use of physical processors and/or software.

In an electronic neural network such as DNN 424, neurons are arranged in layers, shown in FIG. 4 as an input layer 403, a hidden layer 405, and an output layer 407. The input layer 403 includes neurons/nodes that take input data, and send it to a series of hidden layers 405 of neurons, in which all neurons from one layer in the hidden layers 405 are interconnected with all neurons in a next layer in the hidden layers 405. The final layer in the hidden layers 405 then outputs a computational result to the output layer 407, which is often one or more nodes for holding vector information. That is, the output layer 407 often has multiple nodes, each of which holds vector information. In one or more embodiments of the present invention, each neuron in the output layer 407 is associated with a particular output to identify the correction labels 415, as shown in FIG. 4.

As shown in FIG. 4, DNN 424 is used to determine whether the current error should be corrected by debugging the current version of the particular software program or by rewriting the most-recent non-defective version of the particular software program. That is, DNN 424 is trained to recognize that the current error 401 from the current version of the particular software program is of a particular type, and then determines, based on the previous debug parameters 402 and the previous rewriting parameters 404 which approach to take.

For example, assume that inputs into DNN 424 are the current error 401 (e.g., a memory page swap error); the previous debug parameters 402 (e.g., how long it has historically taken a software developer to debug a memory page swap error); and the previous rewriting parameters 404 (e.g., how long it has historically taken that software developer to recode the instructions that caused the error such that the error does not occur).

In this example, the output correction labels 415 would include a debug 417 indicating a direction to debug the error and a rewrite label 419 indicating a direction to differently re-write the code that caused the error. These two correction labels are either/or. That is, the recommendation is to either debug the error or to re-write the problematic code from the most recent error-free version, but not both. As such, the correction label 415 that describes a faster approach (e.g., debug 417) to solving the error has a higher value (due to processing and output from the DNN 424) than the correction label 415 that describes a more time-consuming approach (e.g., rewrite 419).

The output of DNN 424 is the result of training DNN 424 with the previous debug parameters 402 and the previous rewriting parameters 404.

In order to train and utilize DNN 424 in accordance with one or more embodiments of the present invention, descriptions of the operations of DNN 424 are described with reference to FIG. 4.

As mentioned above, each node in the depicted DNN 424 represents an electronic neuron, such as the depicted neuron 409. As shown in block 411, each neuron (including neuron 409) includes multiple features, such as: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407.

In one or more embodiments of the present invention, the mathematical function shown in block 411 is a comparison function. That is, this mathematical function compares the similarity of metadata from the current error 401 and metadata associated with errors described in the previous debug parameters 402 and the previous rewriting parameters 404. That is, the mathematical function is code that has been written to 1) determine how similar the type of the current error 401 is to other error(s) that have been previously debugged by the software developer (as found in the previous debug parameters 402); 2) other error(s) that have been corrected by rewriting code from a most recent error-free version of the particular software program (e.g., as found in the previous rewriting parameters 404); and 3) how long each approach took.

For example, assume that current error 401 includes metadata about a particular current error in a current version of a particular software program (e.g., "memory page swap error").

Assume further that previous debug parameters 402 include metadata about previous debugging operations performed by the software developer, such as metadata that describes the type of error (e.g., "memory page swap error") as well as how long it has taken the software developer to debug that type of error (e.g., "20 minutes"). Debugging is defined as going through the flags/alerts (e.g., as shown in a debugging window in an integrated development environment—IDE) in order to identify typographical errors, improper calls to other routines/resources, etc.), and then rewriting the code in the current version of the particular software program.

Assume further that previous rewriting parameters 404 include metadata about previous rewriting performed by the software developer, such as metadata that describes the type of error (e.g., "memory page swap error") as well as how long it has taken the software developer to rewrite the problematic code for that type of error (e.g., "10 minutes"). Rewriting is defined as going back through earlier versions of the particular software program until an error-free version is identified, and then adding new code that provides the intended functionality of the current version of the particular software program (e.g., adding a table to a GUI), where the new code does not cause the error to occur.

As such, the mathematical function(s) are written to 1) compare the type of error in the current error 401 to the type of error described by the metadata from the previous debug parameters 402 and the previous rewriting parameters 404; 2) match the type of error in the current error 401 to the a particular debug parameter from the previous debug parameters 402 and a particular rewriting parameter form the previous rewriting parameters 404; and 3) determine whether the amount of time previously taken (based on other metadata in the previous debug parameters 402 and the previous rewriting parameters 404) to debug the current version or rewrite a previous version of the particular software program is faster.

In one or more embodiments of the present invention, each neuron also has a weight that is specific for that neuron and/or for other connected neurons. Furthermore, the output value(s) are added to bias value(s), which increase or decrease the output value, allowing the DNN 424 to be further "fine-tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. Such adjustments are performed manually or automatically.

When manually adjusted, the mathematical function(s), output value(s), weight(s), and/or bias value(s) are adjusted by the user in a repeated manner until the output from output layer 407 matches expectations. For example, assume that the trainer of DNN 424 assumes that if the amount of time to debug the current code and the amount of time to rewrite the previous code are close (e.g., within a couple of minutes of one another), then the DNN 424 will output a debug 417 label, since confirmation that the debugging solves the problem is often faster than confirming that the rewriting operation works properly. As such, the mathematical function(s), output value(s), weight(s), and/or bias value(s) shown in block 411 are manually adjusted until the debug label 417 is ranked and displayed higher than the rewrite label 419, unless the time differences between debugging and rewriting (as determined by the mathematical function(s) is greater than a predefined value, such as 20 minutes), in which case the rewrite label 419 is given a higher value than the debug label 417.

When automatically adjusted, the mathematical functions, output values, weights, and/or biases are adjusted using "back propagation", in which a "gradient descent" method determines how each mathematical function, output value, weight, and/or bias should be adjusted in order to provide an output. That is, the mathematical function(s), output value(s), weight(s), and/or bias value(s) shown in block 411 are recursively adjusted until the correction labels 415 are ranked and displayed in accordance with how fast their respective operations (debug or rewrite) can be performed.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
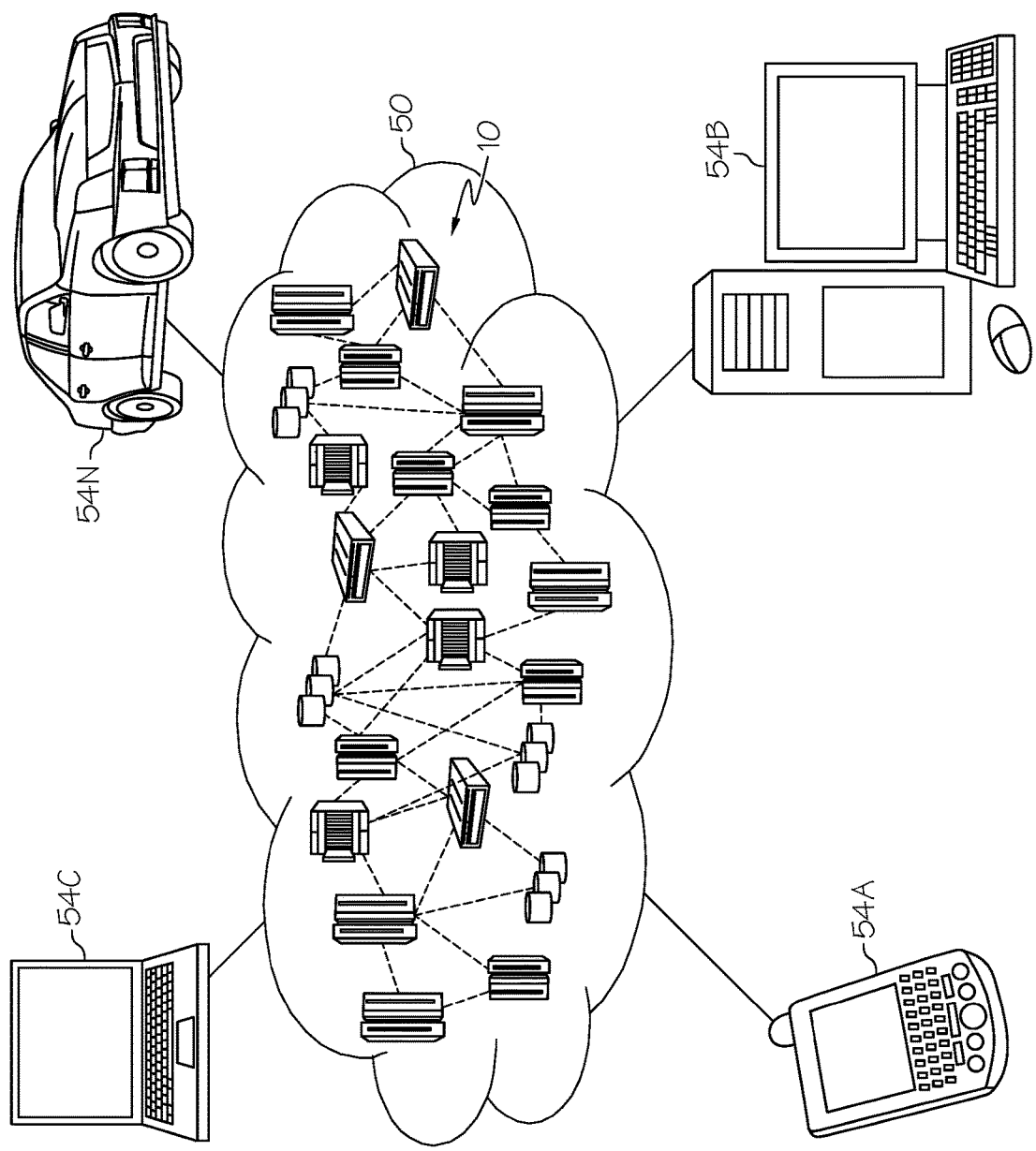
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
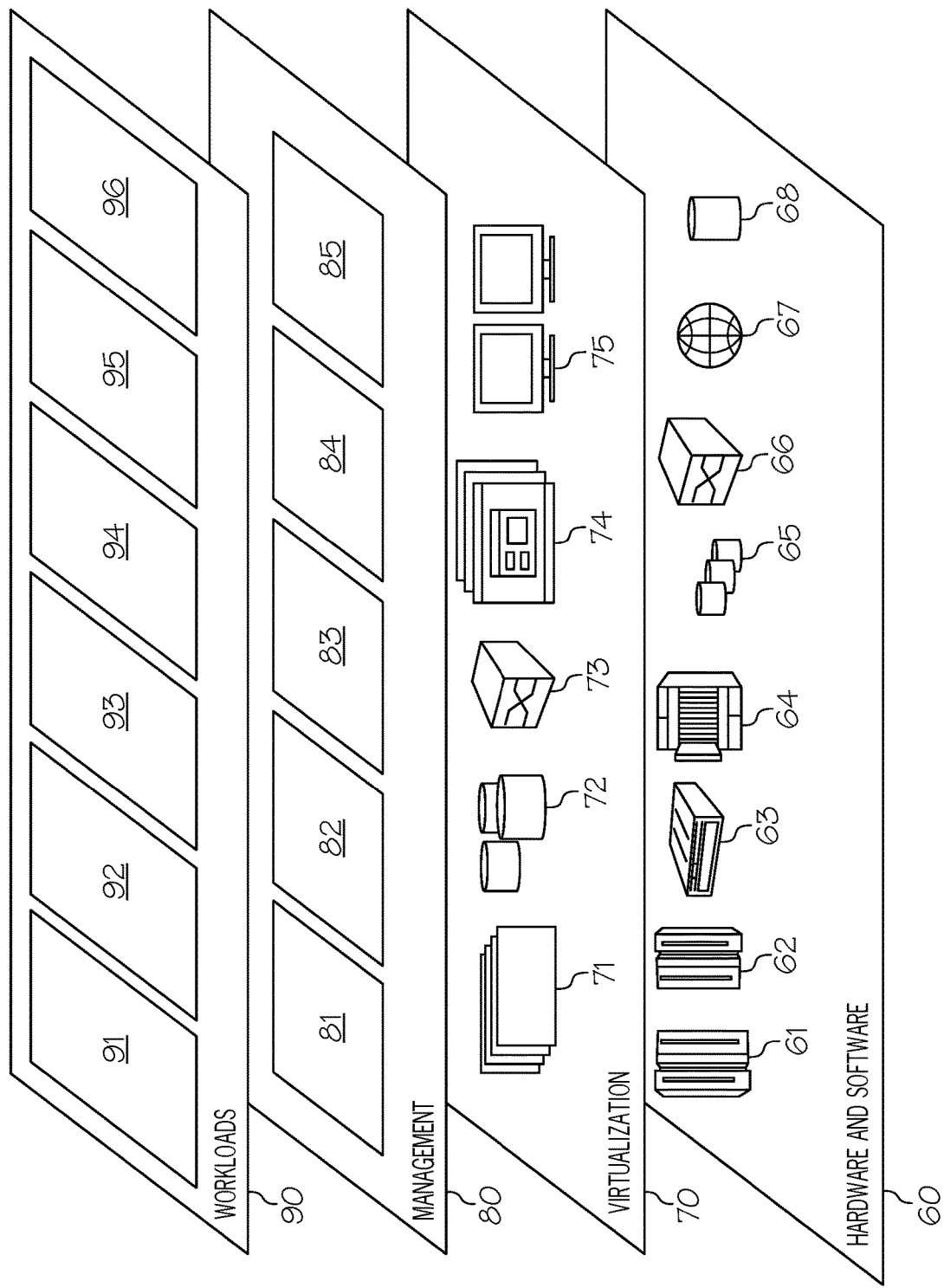
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and software correction processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   determining, based on performing a test on a current version of a particular software program, that the current version of the particular software program has a defect;
   iteratively testing, going backwards in time, one or more previous versions of the particular software program until a most-recent non-defective version of the particular software program, which lacks an intended functionality of the current version of the particular software program, is detected;
   applying machine learning to determine an estimated recreation time for a software developer to create a first non-defective current version of the particular software program from the most-recent non-defective version of the particular software program, wherein the first non-defective current version of the particular software program has the intended functionality but not the defect found in the current version of the particular software program;
   applying machine learning to determine an estimated debug time for the software developer to debug the current version of the particular software program in order to create a second non-defective current version of the particular software program, wherein the second non-defective current version of the particular software program has the intended functionality but not the defect found in the current version of the particular software program;
   comparing the estimated debug time to the estimated recreation time; and
   selectively directing a software developer, based on which of the estimated debug time and the estimated recreation time is shorter as compared to one another, to correct the defect and provide the intended functionality by either debugging the current version of the particular software program or creating the first non-defective current version of the particular software program from the most-recent non-defective version of the particular software program.

2. The method of claim 1, further comprising:
   monitoring coding by the software developer over time on a variety of projects to determine, based on machine learning, how long it takes the software developer to debug various types of errors in code;
   monitoring coding by the software developer over time on the variety of projects to determine, based on machine learning, how long it takes the software developer to create an error-free current version of a software program from an earlier version of the software program; and
   utilizing the monitoring of the coding by the software developer over time on the variety of projects to determine the estimated recreation time and the estimated debug time for the software developer.

3. The method of claim 1, further comprising:
   periodically capturing snapshots of versions of code for the particular software program as one or more functionalities are added to the particular software program, wherein the snapshots of the versions of the code for the particular software program depict only source code used in the versions of the code for the particular software program.

4. The method of claim 1, further comprising:
   periodically capturing snapshots of versions of code for the particular software program as one or more functionalities are added to the particular software program, wherein the snapshots of the versions of the code for the particular software program depict current cache states at a time of the snapshots and identify a currently executing instruction at a time of the snapshots.

5. The method of claim 1, further comprising:
   periodically capturing snapshots of versions of code for the particular software program as one or more functionalities are added to the particular software program, wherein the snapshots of the versions of the code for the particular software program identify a hardware environment of a particular computer that is executing the particular software program at a time of the snapshots.

6. A computer program product comprising a computer readable storage medium having program code embodied therewith, wherein the computer readable storage medium is not a transitory signal per se, and wherein the program code is readable and executable by a processor to perform a method comprising:
   determining, based on performing a test on a current version of a particular software program, that the current version of the particular software program has a defect;
   iteratively testing, going backwards in time, one or more previous versions of the particular software program until a most-recent non-defective version of the particular software program, which lacks an intended functionality of the current version of the particular software program, is detected;
   monitoring coding by the software developer over time on a variety of projects to determine, based on machine learning, how long it takes the software developer to debug various types of errors in code;

monitoring coding by the software developer over time on the variety of projects to determine, based on machine learning, how long it takes the software developer to create an error-free current version of a software program from an earlier version of the software program; and utilizing the monitoring of the coding by the software developer over time on the variety of projects to determine an estimated recreation time and an estimated debug time for the software developer, wherein the estimated recreation time is an estimate of time needed by the software developer to create an error-free current version of the particular software program from the earlier version of the particular software program, and wherein the estimated debug time is an estimate of time needed by the software developer to debug the current version of the particular software program;

comparing the estimated debug time to the estimated recreation time; and selectively directing a software developer, based on which of the estimated debug time and the estimated recreation time is shorter as compared to one another, to correct the defect and provide the intended functionality by either debugging the current version of the particular software program or creating the non-defective current version of the particular software program from the most-recent non-defective version of the particular software program.

7. The computer program product of claim 6, wherein the non-defective current version of the particular software program from the most-recent non-defective version of the particular software program is a first non-defective version of the particular software program, wherein the first non-defective version of the particular software program has the intended functionality but not the defect found in the current version of the particular software program, and wherein the method further comprises:

applying machine learning to determine the estimated recreation time for the software developer to create the first non-defective version of the particular software program; and applying machine learning to determine the estimated debug time for the software developer to debug the current version of the particular software program in order to create a second non-defective version of the particular software program, wherein the second non-defective version of the particular software program also has the intended functionality but not the defect found in the current version of the particular software program.

8. The computer program product of claim 6, wherein the method further comprises:

periodically capturing snapshots of versions of code for the particular software program as one or more functionalities are added to the particular software program, wherein the snapshots of the versions of the code for the particular software program depict only source code used in the versions of the code for the particular software program.

9. The computer program product of claim 6, wherein the method further comprises:

periodically capturing snapshots of versions of code for the particular software program as one or more functionalities are added to the particular software program, wherein the snapshots of the versions of the code for the particular software program depict current cache states at a time of the snapshots and identify a currently executing instruction at a time of the snapshots.

10. The computer program product of claim 6, wherein the method further comprises:

periodically capturing snapshots of versions of code for the particular software program as one or more functionalities are added to the particular software program, wherein the snapshots of the versions of the code for the particular software program identify a hardware environment of a particular computer that is executing the particular software program at a time of the snapshots.

11. The computer program product of claim 6, wherein the program code is provided as a service in a cloud environment.

12. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed by the at least one or more processors to perform a method comprising:

periodically capturing snapshots of versions of code for a particular software program as one or more functionalities are added to the particular software program;

determining, based on performing a test on a current version of the particular software program, that the current version of the particular software program has a defect;

iteratively testing, going backwards in time, captured snapshots of one or more previous versions of the particular software program until a most-recent non-defective version of the particular software program, which lacks an intended functionality of the current version of the particular software program, is detected;

applying machine learning to determine an estimated recreation time for a software developer to create a first non-defective current version of the particular software program from the most-recent non-defective version of the particular software program, wherein the first non-defective current version of the particular software program has the intended functionality but not the defect found in the current version of the particular software program;

applying machine learning to determine an estimated debug time for the software developer to debug the current version of the particular software program in order to create a second non-defective current version of the particular software program, wherein the second non-defective current version of the particular software program has the intended functionality but not the defect found in the current version of the particular software program;

comparing the estimated debug time to the estimated recreation time; and selectively directing a software developer, based on which of the estimated debug time and the estimated recreation time is shorter as compared to one another, to correct the defect and provide the intended functionality by either debugging the current version of the particular software program or creating the first non-defective current version of the particular software program from the most-recent non-defective version of the particular software program.

13. The computer system of claim 12, wherein the method further comprises:
- monitoring coding by the software developer over time on a variety of projects to determine, based on machine learning, how long it takes the software developer to debug various types of errors in code;
- monitoring coding by the software developer over time on the variety of projects to determine, based on the machine learning, how long it takes the software developer to create an error-free current version of a software program from an earlier version of the software program; and
- utilizing the monitoring of the coding by the software developer over time on the variety of projects to determine the estimated recreation time and the estimated debug time for the software developer.

14. The computer system of claim 12, wherein the snapshots of the versions of the code for the particular software program depict only source code used in the versions of the code for the particular software program.

15. The computer system of claim 12, wherein the snapshots of the versions of the code for the particular software program depict current cache states at a time of the snapshots and identify a currently executing instruction at a time of the snapshots.

16. The computer system of claim 12, wherein the snapshots of the versions of the code for the particular software program identify a hardware environment of a particular computer that is executing the particular software program at a time of the snapshots.

17. The computer system of claim 12, wherein the program code is provided as a service in a cloud environment.

\* \* \* \* \*